3,299,077
CYCLOHEXANOL - 2,2,6,6 - TETRAKIS(HYDROXY-METHYL)TETRANICOTINATE AND PREPARATION THEREOF
Tsutomu Irikura, Tokyo, Shimao Sato, Ichikawa-shi, and Yasuo Abe and Kazunori Kasuga, Tokyo, Japan, assignors to Kyorin Seiyaku Kabushiki Kaisha, Tokyo, Japan
No Drawing. Filed Jan. 27, 1965, Ser. No. 428,530
Claims priority, application Japan, July 1, 1964, 39/38,143
1 Claim. (Cl. 260—295.5)

This invention relates to cyclohexanol-2,2,6,6-tetrakis-(hydroxymethyl)tetranicotinate having a general formula as under and the preparation thereof.

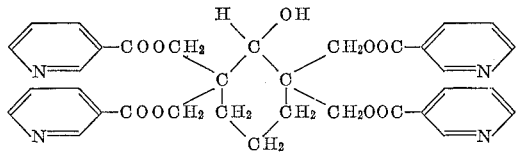

The composition of matter of this invention is a new compound which has not heretofore been described in the literature. The compound can be prepared, for example, by the dehydrochlorination reaction in which 4 parts of nicotinyl chloride or hydrochloric acid salt or other inorganic acid salt reacts, in the presence or absence of a solvent, with 1 part of 2,2,6,6-tetramethylolcyclohexanol.

Inert or indifferent solvents such as anhydrous benzene and toluene are suitable for the process. Suitable deacidification agents are those of basic character, such as pyridine, triethylamine and trimethylamine. Those agents may, according to circumstances, function both as deacidification agent and solvent at the same time. The reaction of this invention can proceed without difficulty by heating the materials at 70–90° C. on a water bath for 2–3 hours.

|  | Normal food | High cholesterol food | High cholesterol food and 0.1% solution of cyclohexanol-2,2,6,6-tetrakis-(hydroxylmethyl)tetranicotinate |
|---|---|---|---|
| Weight of Body: |  |  |  |
| Before adminintration | 16.18±2.33 | 15.25±2.46 | 16.75±3.01 |
| After administration | 17.80±3.34 | 18.16±2.52 | 19.07±4.05 |
| In Blood Serum: |  |  |  |
| Total cholesterol, mg. percent | 110.83 | 298.33 | 257.5 |
| Ester cholesterol, mg. percent | 76.25 | 224.5 | 203.75 |
| Ester/total cholesterol | 0.688 | 0.753 | 0.791 |
| Triglyceride, mg. percent | 86.0 | 125.0 | 112.5 |
| Phospholipid, mg. percent | 187.7 | 244 | 225 |
| Phospholipid/total cholesterol | 1.694 | 0.818 | 0.874 |
| In Liver: |  |  |  |
| Total cholesterol, mg./g | 5.00 | 23.60 | 17.90 |
| Ester cholesterol, mg./g | 2.95 | 18.80 | 13.32 |
| Phospholipid, mg./g | 34.75 | 33.70 | 34.50 |
| Ester/total cholesterol | 0.590 | 0.796 | 0.744 |

Since the hydroxyl group at the 1-position of 2,2,6,6-tetramethylolcyclohexanol is of different nature from other hydroxyl groups, the former did not react with hydrochloric acid salt of nicotinic acid chloride when 5 parts of the salt was employed in the otherwise same condition.

The compound of this invention evidenced useful pharmacological action. For example, a group of mice were fed for 12 days with food of high cholesterol content and a 0.1% aqueous solution of cyclohexanol-2,2,6,6-tetrakis-(hydroxymethyl)tetranicotinate. The cholesterol content of blood serum and liver of the mice was determined as shown in the table.

The content of cholesterol in blood serum and in liver is explicitly lower than that in the control. This implies that the compound of this invention acts to remedy, i.e., counteract, the abnormal metabolism for lipid, hence it is useful for the purpose of decreasing cholesterol content of blood serum.

Example 1

To a mixture of 60 cc. of benzene, 40 cc. of pyridine and 17 g. of hydrochloric acid salt of nicotinic acid chloride, was added 4.5 g. of 2,2,6,6-tetramethylolcyclohexanol, and the whole mixture was refluxed at 75–80° C. for 2.5 hours. After the mixture was cooled water was added. Precipitate formed was separated by filtration, washed thoroughly with water and dried. Recrystallization from dilute acetic acid gave 14 g. of the final compound, M.P. 177–180° C.

Analysis.—Calculated for $C_{34}H_{32}N_4O_9$: C, 63.74%; H, 5.04%; N, 8.74%. Found: C, 63.42%; H, 5.11%; N, 8.58%.

What is claimed is:
Cyclohexanol - 2,2,6,6 - tetrakis(hydroxylmethyl)tetranicotinate having the constitutional formula,

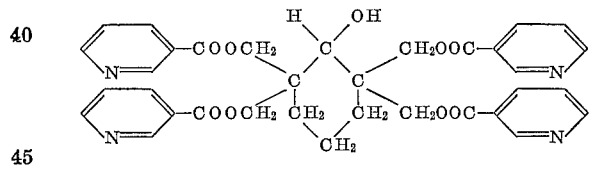

References Cited by the Examiner
FOREIGN PATENTS
M-2046  9/1963  France.

OTHER REFERENCES

Abstract from C.A., vol. 59, pars. 4027a–4028a; French Medical Patent No. M-1629, January 1963.

Fieser and Fieser: Advanced Organic Chemistry, Reinhold (1961), p. 215.

Tauro et al.: (Lab. Guidotti Pisa, Italy), Boll. Chim. Farm., vol. 100, pp. 723 to 731 (1961), (Abstracted from C.A., vol. 57, pars. 7321–7363a).

WALTER A. MODANCE, Primary Examiner.
ALAN L. ROTMAN, Assistant Examiner.